(12) United States Patent
Greene et al.

(10) Patent No.: US 8,363,599 B2
(45) Date of Patent: Jan. 29, 2013

(54) METHOD AND INTERNET PROTOCOL SHORT MESSAGE GATEWAY (IP-SM-GW) FOR PROVIDING AN INTERWORKING SERVICE BETWEEN CONVERGED IP MESSAGING (CPM) AND SHORT MESSAGE SERVICE (SMS)

(75) Inventors: Nancy M. Greene, Outremont (CA);
Nadia Bishai, Dorval (CA); Patrice Varinot, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 353 days.

(21) Appl. No.: 12/787,871

(22) Filed: May 26, 2010

(65) Prior Publication Data

US 2011/0080905 A1    Apr. 7, 2011

Related U.S. Application Data

(60) Provisional application No. 61/249,464, filed on Oct. 7, 2009.

(51) Int. Cl.
*H04W 4/00* (2009.01)
*H04J 3/16* (2006.01)

(52) U.S. Cl. .................. 370/328; 370/466; 455/466

(58) Field of Classification Search .................. None
See application file for complete search history.

(56) References Cited

U.S. PATENT DOCUMENTS

| | | | |
|---|---|---|---|
| 2004/0008723 A1* | 1/2004 | Uchida et al. | 370/466 |
| 2007/0010265 A1 | 1/2007 | Henderson et al. | |
| 2008/0113679 A1* | 5/2008 | Sung et al. | 455/466 |
| 2008/0114881 A1* | 5/2008 | Lee et al. | 709/227 |
| 2009/0131022 A1* | 5/2009 | Buckley et al. | 455/412.1 |
| 2010/0317376 A1* | 12/2010 | Anisimov et al. | 455/466 |

FOREIGN PATENT DOCUMENTS

WO    2008/060085 A1    5/2008

OTHER PUBLICATIONS

CPM-SMS Interworking Chat Scenario, Change Request 23.204 CR 0082 rev 8.4.0., 3GPP TSG-SA WG2 Meeting #75, Kyoto, Japan, Aug. 31-Sep. 4, 2009, pp. 1-3.
3GPP TR 23.824 V1.1.0, 3rd Generation Partnership Project; Technical Specification Group Services and System Aspects; IP-Short-Message-Gateway (IP-SM-GW) enhancements for interworking with OMA CPM (Release 10), Jan. 2010, pp. 1-41.
PCT Search Report from corresponding application PCT/IB2010/054504.

* cited by examiner

*Primary Examiner* — Melanie Jagannathan
(74) *Attorney, Agent, or Firm* — Alex Nicolaescu; Ericsson Canada Inc.

(57) ABSTRACT

A method and an IP-SM-GW for providing an interworking service between CPM and SMS are provided. The method comprises the steps of receiving a chat session invitation, in a IP-SM-GW, the chat session invitation originating from a CPM UE and being sent toward an SMS enabled UE. Assigning an identifier with the chat session in the IP-SM-GW and sending an invitation acknowledgement from the IP-SM-GW to the CPM UE. Receiving a message containing data, within the chat session, in the IP-SM-GW, from the CPM UE and being sent to the SMS enabled UE, formatting the message into an SMS message, wherein the identifier assigned to the chat session is inserted as a sender of the SMS message to ensure that an SMS response is sent back to the IP-SM-GW and forwarding the formatted SMS message to the SMS enabled UE.

1 Claim, 4 Drawing Sheets

METHOD AND INTERNET PROTOCOL SHORT MESSAGE GATEWAY (IP-SM-GW) FOR PROVIDING AN INTERWORKING SERVICE BETWEEN CONVERGED IP MESSAGING (CPM) AND SHORT MESSAGE SERVICE (SMS)

PRIORITY STATEMENT UNDER 35 U.S.C. S.119(E) & 37 C.F.R. S.1.78

This non-provisional patent application claims priority based upon the prior U.S. provisional patent application entitled "INTERNET PROTOCOL SHORT MESSAGE GATEWAY (IP-SM-GW) AND SESSION INTERWORKING", application No. 61/249,464, filed Oct. 7, 2009, in the names of Nancy M. GREENE, Nadia BISHAI, and Patrice VARINOT.

TECHNICAL FIELD

The present invention relates to the field of messaging and more particularly to interworking between different telecommunication technologies.

BACKGROUND

Telecommunications technologies have evolved dramatically in the course of the last decade, seeing analog transmission technologies, digital transmission technologies and more recently Internet Protocol (IP) based packet transmission technologies.

During the past years, the interest in using mobile telecommunications devices in day-to-day activities has increased. Traditionally, desktop computers, workstations, and other wireline computers allowed users to communicate, for example, via e-mail, instant messaging (IM) and chat. Nowadays, mobile devices, for example, mobile telephones, smartphones, handheld computers, personal digital assistants (PDAs) etc., also allow the users to communicate via e-mail, IM, chat and the like.

Mobile communications devices have evolved and are still evolving with the different transmission technologies that are being introduced. IP Multimedia Subsystems (IMS) is an IP based transmission technology that is currently being introduced into several markets. The introduction of the IMS technology does not go without difficulties. The hardware and communication protocols, for instance, differ from those of older technologies. This causes problems for interworking between the old and new technologies.

One of the problems concerns Session Initiation Protocol (SIP) sessions interworking of Open Mobile Alliance (OMA) Converged IP Messaging (CPM) and Short Message Service (SMS) (CPM-SMS), for allowing SMS user to be invited to participate in chat sessions.

SUMMARY

It is therefore a general object of this invention to provide a method and an improved network node for overcoming at least some interworking problems.

According to an aspect of the invention, a method for providing an interworking service between Converged IP Messaging (CPM) and Short Message Service (SMS) is provided. The method comprises the steps of receiving a chat session invitation, in a Internet Protocol Short Message Gateway (IP-SM-GW), the chat session invitation originating from a CPM User Equipment (UE) and being sent toward an SMS enabled UE. The method comprises the step of assigning an identifier to the chat session in the IP-SM-GW and of sending an invitation acknowledgement from the IP-SM-GW to the CPM UE. The method also comprises the step of receiving a message containing data, within the chat session, in the IP-SM-GW, from the CPM UE, the message containing data being sent to the SMS enabled UE. The method further comprises the step of formatting the message containing data into an SMS message, wherein the identifier assigned to the chat session is inserted as a sender of the SMS message to ensure that an SMS response is sent back to the IP-SM-GW and the step of forwarding the formatted SMS message to the SMS enabled UE.

According to another aspect of the invention, a Internet Protocol Short Message Gateway (IP-SM-GW) for providing an interworking service between Converged IP Messaging (CPM) and Short Message Service (SMS) is provided. The IP-SM-GW comprises a receiving interface for receiving a chat session invitation, the chat session invitation originating from a CPM User Equipment (UE) and being sent toward an SMS enabled UE. The receiving interface is further for receiving a message containing data, within the chat session, from the CPM UE, the message containing data being sent to the SMS enabled UE. The IP-SM-GW further comprises a processor for assigning an identifier to the chat session and for formatting the message containing data into an SMS message, wherein the identifier assigned to the chat session is inserted as a sender of the SMS message to ensure that an SMS response is sent back to the IP-SM-GW. The IP-SM-GW also comprises a sending interface for sending an invitation acknowledgement from the IP-SM-GW to the CPM UE and for forwarding the formatted SMS message to the SMS enabled UE.

According to another aspect of the invention a method for providing an interworking service between a Converged IP Messaging (CPM) and a Message Service is provided. The method comprises the steps of receiving a chat session invitation, in a gateway, the chat session invitation originating from a CPM User Equipment (UE) and being sent toward an other UE, assigning an identifier to the chat session, in the gateway, sending an invitation acknowledgement from the gateway to the CPM UE, within the chat session, receiving a message containing data, in the gateway, from the CPM UE, the message containing data being sent to the other UE, formatting the message containing data, wherein the identifier assigned to the chat session is inserted as a sender of the message containing data to ensure that a response is sent back to the gateway, and forwarding the formatted message to the other UE.

According to another aspect of the invention a method for Service-level Interworking where a Converged IP Messaging (CPM) User Equipment (UE) sends a Chat session invitation to a Short Message Service (SMS) user is provided. The method comprises the following steps. The CPM UE registers to a Serving Call Session Control Function (S-CSCF) according to an IMS registration procedure. The CPM UE sends a session invitation request for a chat session to the S-CSCF, using an appropriate Session Initiation Protocol (SIP) method. The S-CSCF forwards the session invitation to an Internet Protocol Short Message Gateway (IP-SM-GW) based on stored initial Filter Criteria (iFC). The IP-SM-GW performs service authorization based on stored subscriber data retrieved from a Home Location Register (HLR) or a Home Subscriber Server (HSS) at the time of the registration procedure and the IP-SM-GW checks whether a originating subscriber of the CPM UE is authorized to use the Service-level Interworking service. If the originating subscriber of the CPM UE is authorized to use the Service-level Interworking service, the IP-SM-GW acknowledges the session invitation. A session invitation acknowledgement is forwarded by the S-CSCF to the CPM UE, the originating subscriber of the CPM UE sends a message within the chat session containing data to the SMS user, the IP-SM-GW transforms the message into a Short Message and sends it towards the SMS user.

BRIEF DESCRIPTION OF THE DRAWINGS

The objects and advantages of the invention will be understood by reading the detailed description in conjunction with the figures, wherein.

DETAILED DESCRIPTION

Figure 1:
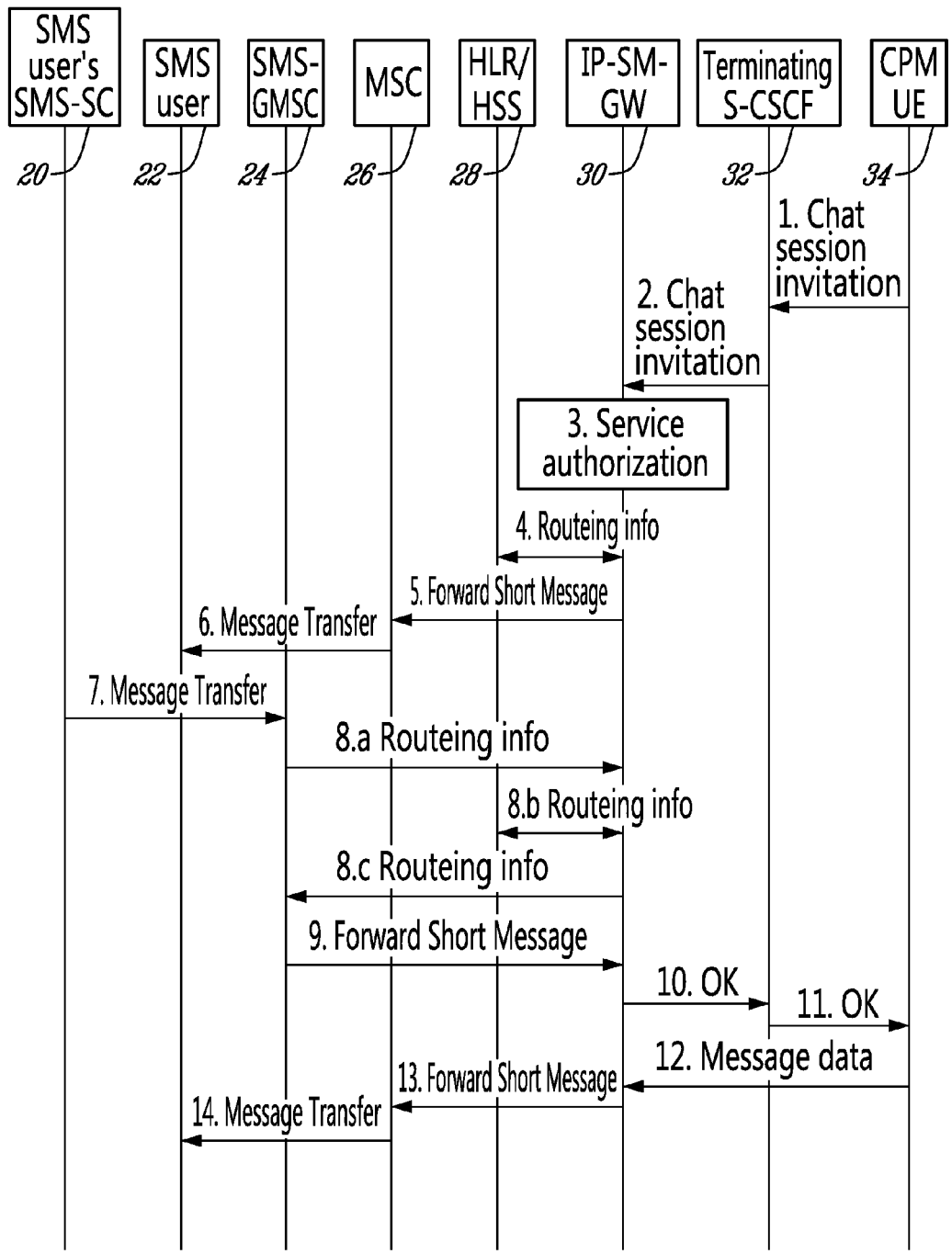
FIG. 1 is a traffic flow according to an exemplary embodiment of the method of the invention.

The various features of the invention will now be described with reference to the figures. These various aspects are described hereafter in greater detail in connection with an exemplary embodiment and example to facilitate an understanding of the invention, but should not be construed as limited to this embodiment. Rather, this embodiment is provided so that the disclosure will be thorough and complete, and will fully convey the scope of the invention to those skilled in the art.

The embodiment according to the present invention is described with reference to block diagrams and/or operational illustrations of methods, servers, and computer program products. It is to be understood that each block of the block diagrams and/or operational illustrations, and combinations of blocks in the block diagrams and/or operational illustrations, can be implemented by radio frequency, analog and/or digital hardware, and/or computer program instructions. Thus, the various aspects of the invention may be embodied in many different forms, and all such forms are contemplated to be within the scope of the invention. The computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks or flows may occur out of the order noted in the operational illustrations. For example, two blocks or steps shown in succession may in fact be executed substantially concurrently or may sometimes be executed in the reverse order, depending upon the functionality/acts involved.

As stated previously, interworking between the old and new technologies causes some problems. One of the problems addressed by the present invention concerns Session Initiation Protocol (SIP) sessions interworking of Open Mobile Alliance (OMA) Converged IP Messaging (CPM) and Short Message Service (SMS) (CPM-SMS), for allowing an SMS user to be invited to participate in chat sessions with IMS users.

A problem occurs, for instance, with the establishment of a one to one chat session or with the establishment of a group chat session involving at least one IMS user and at least one SMS user. For example, if more than one IP-SM-GW is deployed in the IMS network, there is currently no way to be sure that an SMS will be routed to the IP-SM-GW that is acting as the SIP endpoint for the IMS user.

In order for the SMS network to find the specific IP-SM-GW that is acting as an endpoint for a particular one to one chat session or group chat session, the IP-SM-GW that is acting as the SIP endpoint for the IMS user may assign a unique identifier to the chat session and provide this identifier to the SMS user preferably as the sender of the SMS message. The unique identifier identifies the session as well as the IP-SM-GW handling the chat session and allows reply SMS messages to be routed to the proper IP-SM-GW. The unique identifier also allows the IP-SM-GW to correlate the received message to an ongoing session.

According to an aspect of the invention, a method for providing an interworking service between Converged IP Messaging (CPM) and Short Message Service (SMS) is provided. Referring to FIG. 1, the method comprises the steps of receiving a chat session invitation steps 1 and 2, in a Internet Protocol Short Message Gateway (IP-SM-GW) 30. The chat session invitation originates from a CPM User Equipment (UE) 34, and is sent to an SMS enabled UE 20. The method comprises the step of assigning an identifier to the chat session in the IP-SM-GW 30 and of sending an invitation acknowledgement from the IP-SM-GW 30 to the CPM UE 34, steps 10 and 11. The method also comprises the step of receiving a message containing data, step 12, within the chat session, in the IP-SM-GW 30, from the CPM UE 34, the message containing data being sent to the SMS enabled UE 20. The method further comprises the step of formatting the message into an SMS message, wherein the identifier assigned to the chat session is inserted as a sender of the SMS message to ensure that an SMS response is sent back to the IP-SM-GW 30. The method also comprises the step 13 of forwarding the formatted SMS message to the SMS enabled UE 20.

The method may further comprise the steps of receiving the SMS response to the message containing data, from the SMS enabled UE 20, in the IP-SM-GW 30, of formatting the SMS response into a response in a CPM format, and of forwarding the response in the CPM format to the CPM UE 34.

The method may also further comprise before the step of sending the invitation acknowledgement to the CPM UE 34, the steps of converting the chat session invitation to a SMS invitation message, of obtaining routing information, step 4, for the SMS enabled UE 20, from a Home Location Register (HLR) or a Home Subscriber Server (HSS) 28, of sending the SMS invitation message, steps 5 and 6, to the SMS enabled UE 20 and of receiving a SMS response, step 7, from the SMS enabled UE 20 indicating a response to the chat session invitation.

The method may further comprise after the steps of receiving a chat session initiation and of performing service authorization by checking whether the CPM UE 34 is authorized to use the interworking service, step 3.

Preferably, the IP-SM-GW 30 receives the chat session invitation, step 2, from a Serving Call Session Control Function (S-CSCF) 32, and the S-CSCF 32 forwards the chat session invitation, steps 1 and 2, from the CPM UE 34 to the IP-SM-GW 30 based on initial Filter Criteria (iFC) Stored in the S-CSCF.

The chat session invitation may contain a privacy header with a value such as: "header", "user" or "ID". If so, the IP-SM-GW 30 anonymizes the identity of the sender in all messages sent from the IP-SM-GW 30 to the SMS enabled UE 20. The identifier (of the chat session) may be the Mobile Station International Subscriber Directory Number MSISDN of the CPM UE 34. The identifier may also be a Mobile Station International Subscriber Directory Number MSISDN assigned by the IP-SM-GW 30. In this case, the MSISDN may be selected from a database of reusable MSISDNs, available to the IP-SM-GW. The SMS enabled UE 20, described before, may in fact be comprised of multiple UEs 20 and in this case the chat session may be a group chat session. In a group chat session constituted of multiple UEs, other UEs may be using SMS, email, CPM or other means to participate in the chat. In the case of a group chat session, the identifier is preferably a Mobile Station International Subscriber Directory Number MSISDN assigned by the IP-SM-GW. Furthermore, the SMS enabled UE 20 may be a CPM UE which has its preferences set to receive incoming chats as SMS.

According to yet another aspect of the present invention, a method for interworking between CPM and SMS is provided. The method comprises the steps of intercepting a chat session invitation sent from a CPM user to an SMS user, in an IP-SM-GW, and of formatting the session invitation into an SMS message wherein an identifier associated with the session, for routing a response back from the SMS user to the IP-SM-GW directly, is inserted as the sender of the SMS message. The method further comprises the step of intercepting a message sent from the CPM user to the SMS user, in the IP-SM-GW, and formatting the message into an SMS message wherein the identifier, such as a phone number, short code or any other suitable identifier associated with the session such as an MSISDN, for routing a response back from the SMS user to the IP-SM-GW directly, is inserted as the sender of the SMS message. The method further comprises the steps of forwarding the SMS message to the SMS user, receiving an SMS response sent from the SMS user and formatting the SMS response into a response in the CPM format and forwarding the response in the CPM format to the IMS user.

A person skilled in the art would readily understand that the steps of the methods presented previously may be executed in modified order, that some steps may be repeated many times and that during a chat, a same user may send many consecutive messages without receiving any response between each of his messages.

Figure 2:
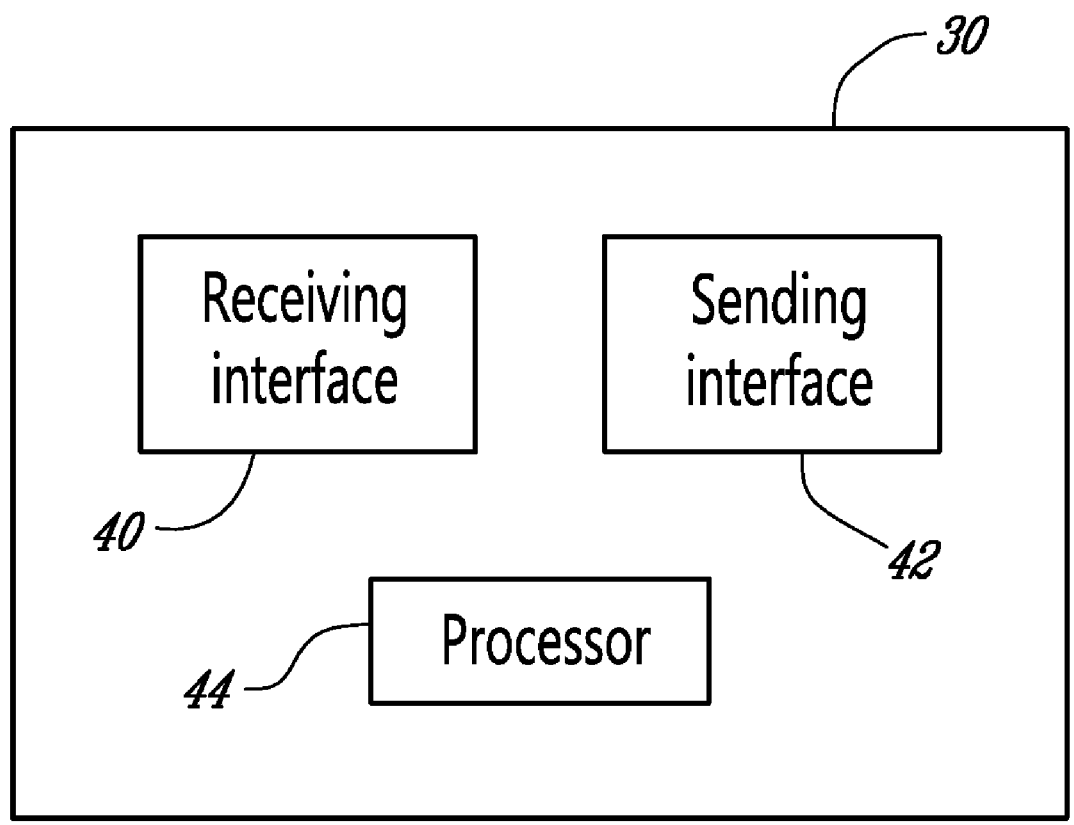
FIG. 2 is a schematic diagram of a IP-SM-GW according to the invention.

Referring now to FIGS. 1 and 2, according to another aspect of the invention, a Internet Protocol Short Message Gateway (IP-SM-GW) 30 for providing an interworking service between Converged IP Messaging (CPM) and Short Message Service (SMS) is provided. The IP-SM-GW comprises a receiving interface 40 for receiving a chat session invitation, the chat session invitation originates from a CPM User Equipment (UE), the chat session invitation being sent to an SMS enabled UE. The receiving interface is further for receiving a message containing data, within the chat session, from the CPM UE, the message containing data being sent to the SMS enabled UE. The IP-SM-GW 30 further comprises a processor 44 for assigning an identifier to the chat session and for formatting the message into an SMS message, wherein the identifier assigned to the chat session is inserted as a sender of the SMS message to ensure that an SMS response is sent back to the IP-SM-GW 30. The IP-SM-GW 30 also comprises a sending interface 42 for sending an invitation acknowledgement from the IP-SM-GW 30 to the CPM UE and for forwarding the formatted SMS message to the SMS enabled UE 20.

The receiving interface 40 of the IP-SM-GW 30 is further for receiving the SMS response from the SMS enabled UE 20, the processor 44 is further for formatting the SMS response into a response in a CPM format and the sending interface 42 is further for forwarding the response in the CPM format to the CPM UE 34.

The processor 44 of the IP-SM-GW 30 is further for converting the chat session invitation to a SMS invitation message. The receiving interface 40 is further for obtaining routing information for the SMS enabled UE 20, from a Home Location Register (HLR) or a Home Subscriber Server (HSS) 28 and for receiving a SMS response from the SMS enabled UE 20 indicating a response to the chat session invitation. The sending interface 42 is further for sending the SMS invitation message to the SMS enabled UE 20.

The processor 44 is further for performing service authorization by checking whether the CPM UE 34 is authorized to use the interworking service. The IP-SM-GW 30 is in communication with a Serving Call Session Control Function (S-CSCF) 32. The IP-SM-GW 30 receives the chat session invitation from the S-CSCF 32 and the S-CSCF forwards the chat session invitation from the CPM UE 34 to the IP-SM-GW 30 based on initial Filter Criteria (iFC) stored in the S-CSCF.

According to yet another aspect of the invention an improved IP-SM-GW is provided. The IP-SM-GW comprises means for intercepting a chat session invitation sent from a CPM user to an SMS user, and for formatting the session invitation into an SMS message wherein an identifier associated with the session, for routing a response back from the SMS user to the IP-SM-GW directly, is inserted as the sender of the SMS message. The means for intercepting may be any input, an I/O or a connection means known to a person skilled in the art. In the case of an IMS node, this means may be a receptor able to communicate via the SIP protocol, for example, or any equivalent. The means for establishing a session between the CPM and the SMS user in the IP-SM-GW may take the form of a processor executing software or any hardware logic capable of establishing the session.

The IP-SM-GW further comprises means for intercepting a message sent from the CPM user to the SMS user, in the IP-SM-GW, and for formatting the message into a SMS message wherein the identifier such as a phone number, a short code or any other suitable identifier associated with the session, for routing a response back from the SMS user to the IP-SM-GW directly, is inserted as a sender of the SMS message. The means for intercepting may be similar to means described previously. The means for formatting may again be a processor executing software or any other kind of suitable hardware.

The IP-SM-GW further comprises means for forwarding the SMS message to the SMS user, which can be in the form of a transmitter able to communicate via the SIP protocol, for example. The IP-MS-GW further comprises means for receiving an SMS response sent from the SMS user and for formatting the SMS response into a response in the CPM format. Those means may be a receptor and a processor executing software or any other kind of suitable hardware. The IP-SM-GW further comprises means for forwarding the response in the CPM format to the IMS user, the means for forwarding may be a transmitter as described before or any other equivalent.

Figure 3:
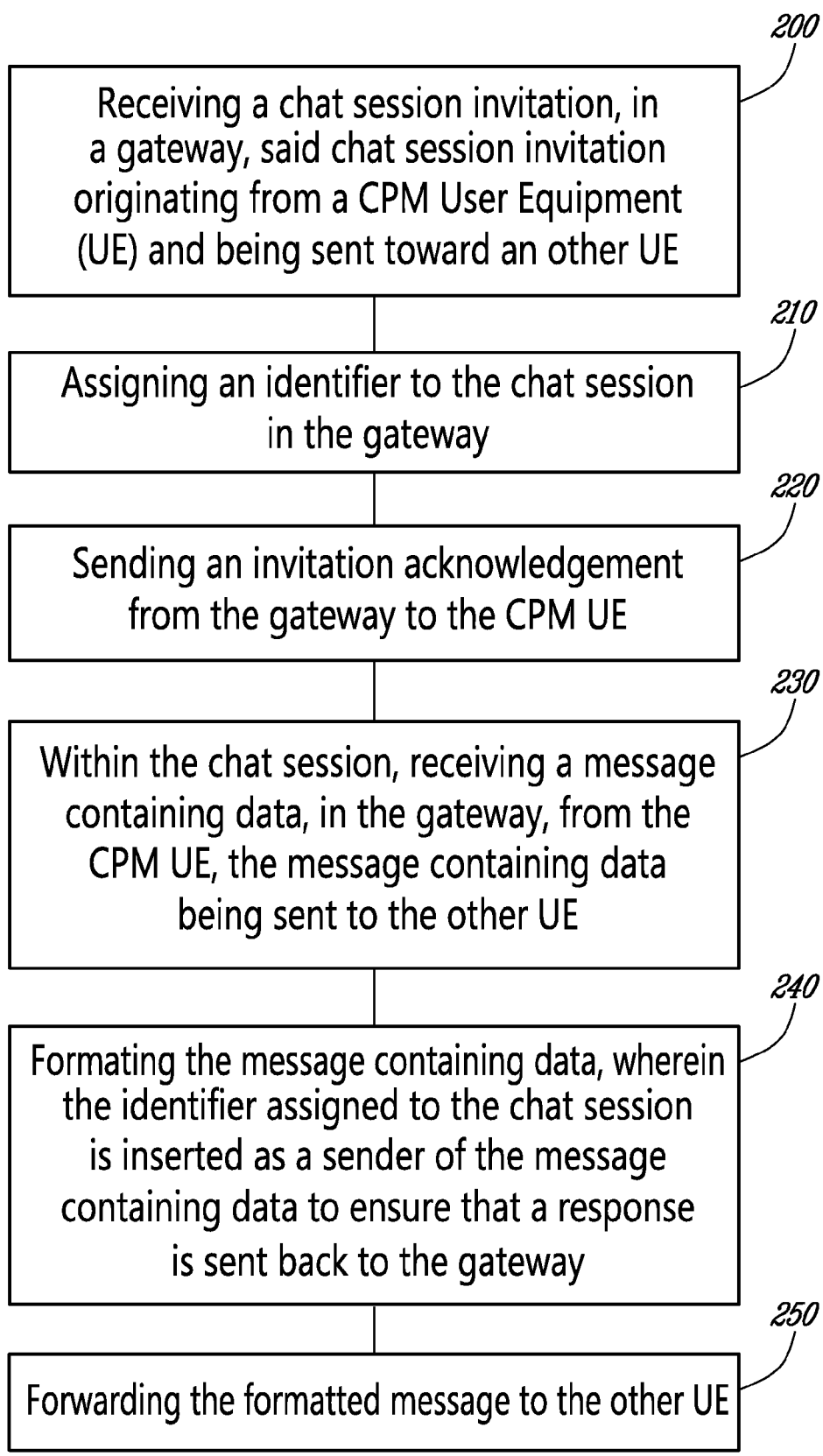
FIG. 3 is a flowchart of a method according to the invention.

Referring to FIG. 3, according to yet another aspect of the invention, a method for providing an interworking service between Converged IP Messaging (CPM) and a Message Service is provided. The method comprises the step of receiving, step 200, a chat session invitation, in a gateway, the chat session invitation originates from a CPM User Equipment (UE) and is sent toward an other UE. The method comprises the steps of assigning, step 210, an identifier to the chat session in the gateway, sending, step 220, an invitation acknowledgement from the gateway to the CPM UE, within the chat session. The method further comprises the steps of receiving, step 230, a message containing data, in the gateway, from the CPM UE, the message containing data being sent to the other UE, formatting, step 240, the message, wherein the identifier assigned to the chat session is inserted as a sender of the message to ensure that a response is sent back to the gateway and forwarding, step 250, the formatted message to the other UE. As it would be apparent to one skilled in the art, the other UE may be a Multimedia Messaging Service (MMS) enabled UE and the message may be an MMS message.

Figure 4:
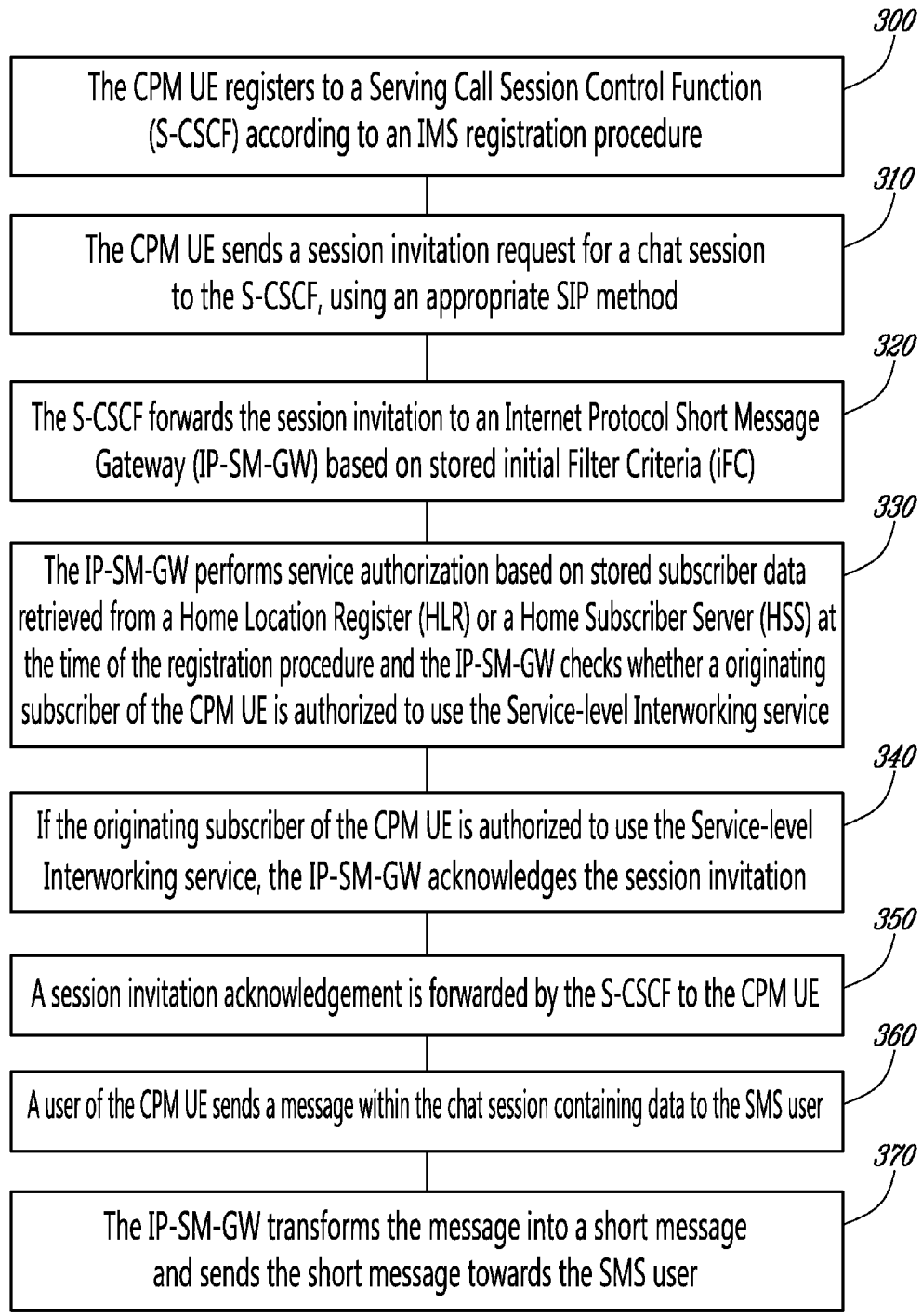
FIG. 4 is another flowchart of yet another method according to the invention.

Referring to FIG. 4, according to yet another aspect of the invention a method for Service-level Interworking where a Converged IP Messaging (CPM) User Equipment (UE) sends a chat session invitation to a Short Message Service (SMS) user is provided. The method comprises the following steps. At step 300, the CPM UE registers to a Serving Call Session Control Function (S-CSCF) according to an IMS registration procedure. At step 310, the CPM UE sends a session invitation request for a chat session to the S-CSCF, using an appropriate SIP method. At step 320, the S-CSCF forwards the session invitation to an Internet Protocol Short Message Gateway (IP-SM-GW) based on stored initial Filter Criteria (iFC). At step 330, the IP-SM-GW performs service authorization based on stored subscriber data retrieved from a Home Location Register (HLR) or a Home Subscriber Server (HSS) at the time of the registration procedure and the IP-SM-GW checks whether a originating subscriber of the CPM UE is authorized to use the Service-level Interworking service. At step 340, if the originating subscriber of the CPM UE is authorized to use the Service-level Interworking service, the IP-SM-GW acknowledges the session invitation. At step 350, a session invitation acknowledgement is forwarded by the S-CSCF to the CPM UE. At step 360, a user of the CPM UE sends a message within the chat session, the message containing data, to the SMS user. At step 370, the IP-SM-GW transforms the message into a short message and sends the short message towards the SMS user.

A traffic flow according to an exemplary embodiment of the method of the invention is shown in FIG. 1. Each step of the embodiment illustrated in this figure will now be described in more details. At step 1, the CPM User Equipment (UE) 34 sends a session invitation request for a Message Session Relay Protocol (MSRP) session to a CPM user 20 in another IMS domain or in the same IMS domain, using the appropriate SIP method. The UE 34 may request to hide its Public User Identity from the recipient within the session invitation. The originating Serving Call Session Control Function (S-CSCF) 32, not shown, resolves the destination domain and routes the session invitation towards the S-CSCF 32 in the terminating network, the "terminating S-CSCF".

At step 2, the terminating S-CSCF 32 forwards the session invitation to the IP-SM-GW 30 based on stored initial Filter Criteria (iFC) held in the S-CSCF 32.

At step 3, the authorization to continue is checked in the IP-SM-GW 30. If the sender of the session invitation asks to hide its Public User Identity from the recipient and the operator policy allows for this, the IP-SM-GW 30 may render anonymous the identity of the user in all messages he sends to the recipient. Otherwise, if operator policy prohibits anonymity, the IP-SM-GW 30 may return an appropriate error to the user.

The steps 4 to 9 may be executed optionally, if the operator policy is to check back with the SMS user 20 before accepting the invitation on behalf of the SMS user 20. Otherwise, the process may continue with step 10, as if the SMS user 20 had responded in a positive manner.

At step 4, the IP-SM-GW 30 performs service-level interworking by converting the session invitation request to a Short Message. The IP-SM-GW 30 obtains the routing information for the destination UE 20 from the Home Location Register (HLR) or Home Subscriber Server (HSS) 28.

At step 5, the IP-SM-GW 30 sends a Forward Short Message message to the target Mobile Switching Center (MSC) 26. The IP-SM-GW 30 inserts an identifier or address representing the chat session to ensure that the reply to this SMS is sent back to it. The identity of the original sender, i.e. the CPM user 34 or group, is included as part of the operator provided invitation text.

At step 6, the MSC 26 sends the Short Message to the SMS user 20.

At step 7, a SMS message is received from the SMS user 20 by the Short Message Service Gateway Mobile Switching Center (SMS-GMSC) 24, indicating the acceptance of the chat session. The identifier or address assigned by the IP-SM-GW 30 is thereafter used by the SMS user 20 to send chat messages to the CPM user 34.

At step 8a, the SMS-GMSC 24 interrogates the HSS 28 to retrieve routing information. Based on the identifier previously inserted by the IP-SM-GW 30, the HSS 28 forwards the request to the corresponding IP-SM-GW 30.

At step 8b, the HLR or HSS 28 returns the International Mobile Subscriber Identity (IMSI) and the identifier or address of the IP-SM-GW 30.

At step 8c, the IP-SM-GW 30 creates a Mobile Terminating Correlation Identifier (MT Correlation ID), which is a service element used only when the Home Public Land Mobile Network (HPLMN) of the receiving UE is using an SMS Router. It is used to correlate a Forward SM operation to a previous Info Retrieval operation (as defined in the document TS 23.040: 3rd Generation Partnership Project; Technical Specification Group Core Network and Terminals; Technical realization of the Short Message Service (SMS), included herein by reference) which associates the Routing Info retrieval with the subsequent Forward Short Message messages(s), and which stores this along with the IMSI of the receiving subscriber. The IP-SM-GW 30 returns to the SMS-GMSC 24 its own address, along with the MT Correlation ID in the IMSI field, as routing information.

At step 9, the SMS-GMSC 24 delivers the Short Message to the IP-SM-GW 30 in the same manner that it delivers the Short Message to an MSC or Serving General Packet Radio Service (GPRS) Support Node (SGSN), including the MT Correlation ID received from the IP-SM-GW 30, in place of the IMSI.

At step 10, if the answer is positive, the IP-SM-GW 30 acknowledges the session invitation. Otherwise the IP-SM-GW 30 sends back an error response.

At step 11, the session invitation acknowledgement is forwarded by the S-CSCF 32 to the UE 34.

The steps 12 to 14 may be executed only if an SMS with a positive answer is received to the session invitation from the SMS user 20 or if the operator policy indicates that the session is accepted without SMS user interaction. In a case where a negative response to the invitation is received or if no response from the SMS user 20 is received within an operator defined time, the IP-SM-GW 30 may send a negative response to the chat invitation.

At step 12, the CPM user 34 sends a message containing data to the recipient SMS user 20.

At step 13, the IP-SM-GW 30 transforms the received message into an SMS message and sends a Short Message (SMS-DELIVER) towards MSC Address as described in TS 23.040. The IP-SM-GW 30 inserts the identifier or address representing the chat session as the sender of the message, to ensure that the reply to this SMS is sent back to it. Every message for this chat session sent from the SMS user may be sent to this identifier or address, provided by the IP-SM-GW 30.

At step 14, the MSC 26 forwards the Short Message (SMS-DELIVER) to the SMS-User 20, as described in TS 23.040.

The proposed solution allows an SMS user 20 to participate in a one to one chat or in a group chat where at least one of the other parties is part of an IMS network. In the one to one case, the SMS user 20 may know that a SMS sent to the unique one to one chat number will be part of a chat session, whereas a SMS sent directly to the recipient's Mobile Station International Subscriber Directory Number (MSISDN) may arrive outside the chat session. Therefore, the SMS user 20 may still be able to send SMS outside the chat session, even to the same user with which he is currently chatting.

The invention has been described with reference to a particular embodiment. However, it will be readily apparent to those skilled in the art that it is possible to embody the invention in specific forms other than those of the embodiment described above. The described embodiment is merely illustrative and should not be considered restrictive in any way.

The invention claimed is:

1. A method for Service-level Interworking where a Converged IP Messaging (CPM) User Equipment (UE) sends a chat session invitation to a Short Message Service (SMS) user, comprising the steps of:
  a) the CPM UE registers to a Serving Call Session Control Function (S-CSCF) according to an IMS registration procedure;
  b) the CPM UE sends a session invitation request for a chat session to the S-CSCF, using an appropriate SIP method;
  c) the S-CSCF forwards the session invitation to an Internet Protocol Short Message Gateway (IP-SM-GW) based on stored initial Filter Criteria (iFC);
  d) the IP-SM-GW performs service authorization based on stored subscriber data retrieved from a Home Location Register (HLR) or a Home Subscriber Server (HSS) at the time of the registration procedure and the IP-SM-GW checks whether a originating subscriber of the CPM UE is authorized to use the Service-level Interworking service;
  e) if the originating subscriber of the CPM UE is authorized to use the Service-level Interworking service, the IP-SM-GW acknowledges the session invitation;
  f) a session invitation acknowledgement is forwarded by the S-CSCF to the CPM UE;
  g) a user of the CPM UE sends a message within the chat session containing data to the SMS user;
  h) the IP-SM-GW transforms the message into a short message and sends the short message towards the SMS user.

* * * * *